US007971397B2

(12) United States Patent
Georgakis

(10) Patent No.: US 7,971,397 B2
(45) Date of Patent: Jul. 5, 2011

(54) TUNED LIQUID DAMPER

(75) Inventor: Christos T. Georgakis, Holte (DK)

(73) Assignee: DTU, Technical University of Denmark, Lyngby (DK)

( * ) Notice: Subject to any disclaimer, the term of this patent is extended or adjusted under 35 U.S.C. 154(b) by 92 days.

(21) Appl. No.: 12/279,312

(22) PCT Filed: Feb. 15, 2007

(86) PCT No.: PCT/DK2007/000075
§ 371 (c)(1),
(2), (4) Date: Oct. 29, 2008

(87) PCT Pub. No.: WO2007/093180
PCT Pub. Date: Aug. 23, 2007

(65) Prior Publication Data
US 2009/0049767 A1 Feb. 26, 2009

Related U.S. Application Data

(60) Provisional application No. 60/774,064, filed on Feb. 15, 2006.

(30) Foreign Application Priority Data

Feb. 15, 2006 (EP) .................................... 06388008

(51) Int. Cl.
*E04H 9/02* (2006.01)
*F16F 9/10* (2006.01)
*F16F 9/00* (2006.01)

(52) U.S. Cl. ..................... 52/167.2; 52/167.8; 52/167.1; 188/378

(58) Field of Classification Search ................. 52/167.1, 52/167.4, 167.6, 167.7, 167.8, 168, 167.2, 52/167.3, 167.5, 167.9; 416/31; 61–64, 80–82
See application file for complete search history.

(56) References Cited

U.S. PATENT DOCUMENTS

| 3,228,494 | A | * | 1/1966 | Rumsey .......................... 188/276 |
| 3,731,709 | A | * | 5/1973 | Glover ............................ 138/37 |
| 3,836,155 | A | * | 9/1974 | Joannou ......................... 369/248 |
| 4,251,080 | A | * | 2/1981 | Sumachev ..................... 369/248 |
| 4,922,671 | A |   | 5/1990 | Sato et al. |
| 5,219,144 | A | * | 6/1993 | Fox et al. ....................... 248/562 |
| 5,353,559 | A |   | 10/1994 | Murota et al. |
| 5,380,100 | A | * | 1/1995 | Yu .................................... 384/99 |
| 5,497,861 | A |   | 3/1996 | Brotz |
| 5,560,161 | A |   | 10/1996 | Lou |
| 6,626,642 | B1 | * | 9/2003 | Veldkamp ....................... 416/79 |
| 6,860,371 | B2 | * | 3/2005 | Ananthanarayanan et al. ............................ 188/322.22 |
| 2001/0004924 | A1 | * | 6/2001 | Aoki et al. ................. 156/394.1 |
| 2004/0201153 | A1 |   | 10/2004 | Chen |
| 2005/0050809 | A1 |   | 3/2005 | Ju et al. |

FOREIGN PATENT DOCUMENTS

JP 2000249186 9/2000

* cited by examiner

*Primary Examiner* — Jeanette E. Chapman
(74) *Attorney, Agent, or Firm* — Fish & Richardson P.C.

(57) ABSTRACT

A tuned liquid damper comprising a housing with a hollow cavity within said housing and a first fluid which partially fills said hollow cavity. The inner surface of said hollow cavity is essentially spherical. The tuned liquid damper further comprises first fluid damping means arranged within the essentially spherical cavity of the housing. In this way, a tuned liquid damper is provided which has a response which is constant and independent of the orientation of the tuned liquid damper. Damping means are provided in order to be able to control the damping effect of the tuned liquid damper.

16 Claims, 9 Drawing Sheets

TUNED LIQUID DAMPER

CROSS REFERENCE TO PRIOR APPLICATIONS

This application is the U.S. national phase of International Application No. PCT/DK2007/000075, filed Feb. 15, 2007, which claims priority from U.S. Provisional Application No. 60/774,064, filed Feb. 15, 2006 and European Application No. 06388008.2, filed Feb. 15, 2006. Each application is incorporated herein by reference in their entirety. The International Application was published in English on Aug. 23, 2007 as WO 2007/093180 under PCT Article 21(2).

The current invention relates to a tuned liquid damper. The tuned liquid damper of the current invention comprises a housing with a hollow cavity arranged within the housing and a fluid which at least partially fills said hollow cavity.

A tuned liquid damper (TLD) is a kind of passive mechanical damper apparatus that relies upon the motion of a fluid in a tank for changing the dynamic characteristics of the structure to which it is attached. In addition, a tuned liquid damper dissipates the vibration energy of the structure to which it is attached.

It is to be noted that "Tuned Liquid Damper (TLD)" is the term typically used in the scientific literature to describe the devices to which the current invention relates. It is therefore also used in this patent application. It is however noted that the "Liquid" part of the TLD should be assumed to be any type of fluid, even though the name specifically mentions "liquid". Fluids for the sake of this application could include, for example, all types of liquids, mixtures of different liquids suspensions, certain types of gasses, etc. The list of possibilities is unlimited.

BACKGROUND ART

Tuned liquid dampers are well known to the person skilled in the art and are discussed in general textbooks which deal with the dissipation of vibration energy present in structures. The tuned liquid dampers known in the prior art are typically either rectangular or cylindrical tanks. Rectangular TLDs are typically used on buildings with a rectangular cross section and cylindrical TLDs are typically used on structures with a square or circular cross section.

A first example is US 2005/0050809 A1 which discloses a rectangular TLD which is located on the top floor of a tall building and which is used for dampening the vibrations of the building. U.S. Pat. No. 5,560,161 describes a more advanced TLD where the motion of the water in the tank is actively controlled in order to better control the damping characteristics of the damper.

However, it has been discovered that the rectangular and cylindrical tuned liquid dampers have a number of disadvantages. For the first, it can be shown that a significant portion of the liquid in a rectangular or cylindrical liquid damper does not move during the motion of the structure and it therefore does not contribute to the damping effect of the TLD. In other words, the "participation mass" of the liquid is quite low. The rectangular and cylindrical liquid dampers are therefore quite heavy since a large amount of liquid is required to obtain the desired damping effect. Furthermore, the rectangular and cylindrical tuned liquid dampers do not work well for rotational vibrations. In addition, rectangular and cylinder TLDs do not work in situations where the TLD is exposed to large angular motions or in cases where proper alignment of the TLD is difficult to achieve.

As a side note, we note that JP 2000249186 A shows a device which is similar in appearance to the device of the current invention, but which has an entirely different purpose. The device disclosed by JP 2000249186 A is of the "Lancaster Damper" type and is not considered to be a tuned liquid damper. The damping action of a Lancaster damper device is due to the viscous friction present between two moving objects separated by a viscous fluid. JP 2000249186 A discloses a device where a spherical element is floated inside a spherical housing. A viscous fluid is located in a small gap between the outer spherical housing and the floating inner spherical element. Due to the inertia of the inner object, when the outer housing is rotated, the inner object tends to stay still. Viscous friction therefore occurs between the inner object and the outer housing. This viscous friction allows this device to be used to dampen rotational movements. There is however no damping effect for translational vibrations.

We also note that an article published in 1982 by Sayar and Baumgarten disclosed a spherical container partially filled with a liquid being used as a slosh damper. The full reference to the article is Bashir A. Sayar and J. R. Baumgarten: *Linear and Nonlinear Analysis of Fluid Slosh Dampers*, AIAA Journal, November 1982, Vol. 20, No. 11, pp. 1534-1538. However, it has not been possible to find other references showing the use of liquid slosh dampers with spherical housings. It seems therefore that the person skilled in the art at the time of writing, did not recognize the advantages of a spherical tuned liquid damper. The spherical housing was most likely used in the above mentioned article due to the research available at the time on the motion of fuel in spherical fuel tanks installed on space ships and satellites.

SUMMARY OF THE INVENTION

It is therefore a first aspect of the current invention to provide a tuned liquid damper as mentioned in the opening paragraph which exhibits a higher performance to mass ratio than that which is achievable with currently available tuned liquid dampers.

A second aspect of the current invention is to provide a tuned liquid damper as mentioned in the opening paragraph which can tolerate large angular changes.

A third aspect of the current invention is to provide a tuned liquid damper as mentioned in the opening paragraph which can dampen both rotational and translational vibrations.

The above mentioned aspects are solved in part by a tuned liquid damper as mentioned in the opening paragraph where the inner surface of the hollow cavity is essentially spherical. In this way, a tuned liquid damper is provided which has a higher mass participation factor which means that the performance to mass ratio is improved. Furthermore, the provided tuned liquid damper has a response which is independent of the orientation of the tuned liquid damper. The provided tuned liquid damper can also be used to dampen both rotational and translations motions.

In a preferred embodiment, the tuned liquid damper could further comprise first fluid damping means arranged within the essentially spherical cavity of the housing. In this way, the damping of the damper can be increased. The first fluid damping means could furthermore be self aligning. In this way, the damping action is constant and independent of the orientation of the tuned liquid damper.

In one embodiment of the damping means, the first fluid damping means could comprise a number of elements floating in the first fluid. In another embodiment, the first fluid damping means could be disturbance elements arranged within the essentially spherical cavity of the housing and arranged to disturb the motion of the first fluid. Such disturbance elements could for example be bars, baffles, screens, flanges, etc. . . .

In another preferred embodiment of a tuned liquid damper the tuned liquid damper could further comprise an inner element with an essentially spherical outer surface, where the inner element could be arranged essentially co-centric within the essentially spherical hollow cavity of the housing and could be essentially rigidly connected to the housing. In this way, a damper is provided which could have an even higher mass participation factor.

In one embodiment of the sphere in sphere arrangement, the inner element could comprise an essentially spherical hollow cavity which is at least partially filled with a second fluid. In this way a damper is provided which can be used to dampen two different frequencies.

Second fluid damping means could be arranged within the essentially spherical hollow cavity of the inner element. The first fluid and the second fluid could either be the same fluid or different fluids depending on the desired characteristics of the damper.

In the preferred embodiment, the amount of fluid in the essentially spherical hollow cavity of the housing can be selected such that the natural frequency of said tuned liquid damper essentially matches the desired frequency to be dampened. In the case where there are two inner cavities, the amount of fluid in the essentially spherical hollow cavity of the housing can be selected such that the natural frequency of the fluid motion in the cavity of the housing essentially matches the first desired frequency to be dampened and the amount of fluid in the essentially spherical hollow cavity of the inner element can be selected such that the natural frequency of the fluid motion in the cavity of the inner element essentially matches the second Frequency to be dampened.

In another embodiment of the tuned liquid damper according to the current invention the fluid used could be an electro or a magnetic rheological fluid. In another embodiment, the fluid could be a thixopropic fluid. Using fluids of these types increases the possibilities for control of the TLD.

In another embodiment of the tuned liquid damper according to the current invention, the housing could be arranged as a partial sphere. This type of TLD will be useful in cases where the natural frequency of the TLD requires a large diameter and low fluid height. As with the full sphere, it can also be imagined that a partial sphere is arranged inside another partial sphere. Furthermore in another embodiment, it could be imagined that at least one of the partial spherical housings comprised cylindrical walls extending upwards from the upper surface of the partial sphere.

The tuned liquid damper according to the current invention can be used in a very large number of different applications. The scope of protection of the current invention should therefore not be limited to a specific use. One example use of the TLD is to dampen the motion of a cable. In another example, the damper is used to dampen the motion of a building. In another example the tuned liquid damper is used to dampen the rotational motion of an object. Another example is to use the TLD to dampen the motion of a telecommunications tower or mast. Another example is to dampen the motion of a wind-turbine wing or tower. As can be seen there are many possible uses for a TLD according to the invention.

BRIEF DESCRIPTION OF THE FIGURES

The invention will now be described in more detail with reference to two different embodiments of a tuned liquid damper according to the invention. It should be obvious to the person skilled in the art that the teaching of the invention can be applied to other embodiments and that the embodiments shown in the figures should therefore not limit the scope of the invention.

FIG. 14 shows a perspective view. FIG. 15 shows a cross section view according to the line XV-XV in FIG. 14. FIG. 16 shows a top view.

FIG. 17 shows a perspective view. FIG. 18 shows a cross section view according to the line XVIII-XVIII in FIG. 17. FIG. 19 shows a top view.

DETAILED DESCRIPTION

As a form of introduction to this section, we note that the topic of vibrations in mechanical structures is a topic on which a large amount of scientific literature has been written, both articles and textbooks. Furthermore, we note that the topic of TLDs has been frequently covered in the publicly available literature. The following discussion is therefore written with the assumption that the reader is familiar with the basic theory of TLDs and vibrational theory. In case that the reader is not familiar with this theory, the reader is referred to the available literature for the details. Two good example references are J. P. den Hartog; Mechanical Vibrations, 4th Ed. New York, Pub. 1985 and T. T. Soong, G. F. Dargush; Passive Energy Dissipation Systems in Structural Engineering, John Wiley & Son Ltd, 1997. The relevant passages in these references are incorporated herein by reference.

Figure 1:
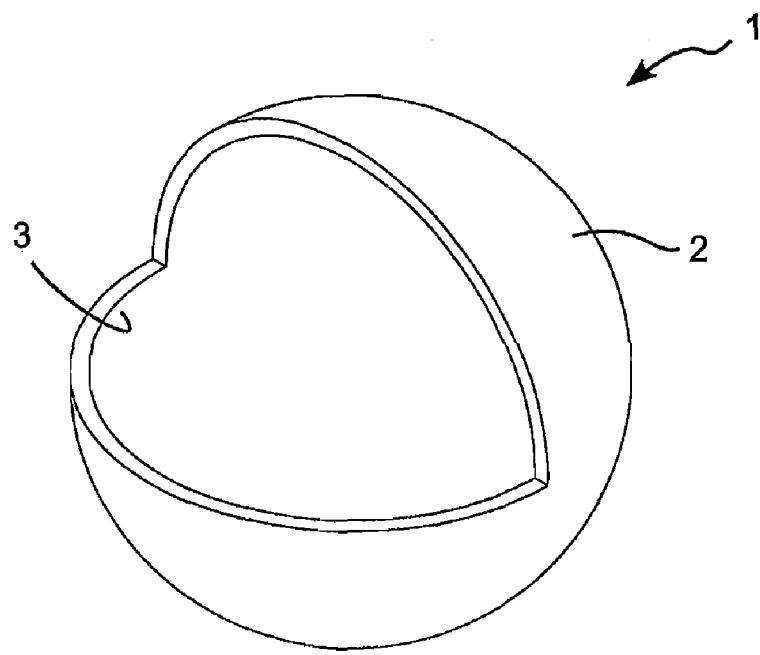
FIG. 1 shows a perspective partial section view of a first embodiment of a spherical tuned liquid damper according to the invention.
Figure 2:
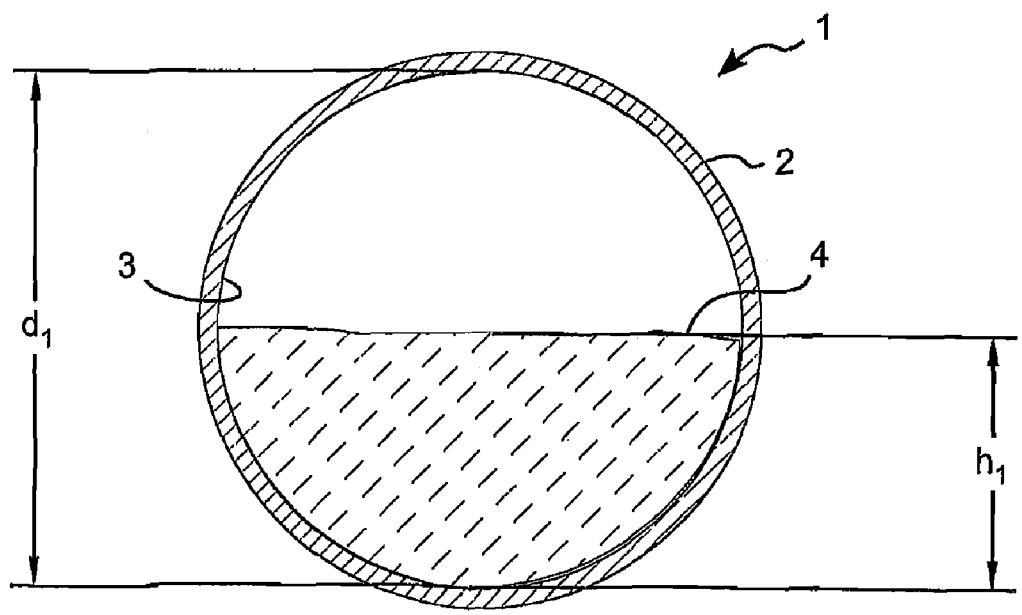
FIG. 2 shows a cross section view of the spherical tuned liquid damper of FIG. 1.

FIGS. 1 and 2 show a first and simple embodiment 1 of a spherical tuned liquid damper (STLD) according to the invention. The STLD 1 comprises a spherical housing 2 and a hollow inner cavity 3 inside the housing 2. The inner surface of the hollow inner cavity 3 is spherical with a diameter of "$d_1$". The hollow inner cavity 3 is partially filled with a fluid 4. The amount of fluid 4 in the hollow inner cavity 3 is defined by the height "$h_1$" of the liquid. When the STLD 1 is displaced, the liquid will slosh back and forth within the inner cavity 3. However, it should be noted that from experimental tests, it can be seen that at around the dominant frequency of the STLD, the motion of the fluid in the STLD becomes circular. The sloshing effect of the fluid therefore reduces around the dominant frequency of the STLD.

The natural frequency of the STLD is a function of the diameter $d_1$ of the inner cavity 3 and the height $h_1$ of the fluid. It is to be noted that while a few authors have proposed theoretical methods to calculate the natural frequency of a fluid sloshing in a spherical tank, at the time of the writing of this description, the most accurate way of determining the natural frequency is via experimental tests. Therefore, the theoretical methods can be used to get the first design values which can then be optimized and tuned with experimental testing.

For the theoretical methods of calculating the natural frequency of a fluid sloshing in a spherical tank please refer to the following four listed references.

Bernard Budiansky: *Sloshing of liquids in circular canals and spherical tanks*, J. of Aero/Space sciences, March 1960, Vol. 27, No. 3, pp 161-173.

J. L. McCarty & D. G. Stephens: *Investigations of the Natural Frequency of Fluid in Spherical and Cylindrical Tanks*, National Aeronautics and Space Administration, May 1960, NASA Technical Note D-252, pp. 1-21.

S. Papaspyrou, D. Valougeorgis & S. A. Karamanos: *Refined Solutions of Externally Induced Sloshing in Half-Full Spherical Containers*, J. of Engng. Mech., December 2003, Vol. 129, No. 12, pp. 1369-1379.

J. V. Rattayya: *Sloshing of Liquids in Axisymmetric Ellipsoidal Tanks*, AIAA $2^{nd}$ Aerospace Sciences Meeting, January 1965, No. 65-114, pp. 1-36.

Budiansky and Rattayya use a theoretical approach and McCarty uses an experimental approach. The results are disclosed in graphical form. Papaspyroij presents an approximate formula which only works for a half full sphere. These articles are incorporated herein by reference.

Due to the spherical shape of inner cavity 3 of the STLD, the natural frequency of the STLD 1 is essentially constant, no matter what the orientation of the STLD is, The STLD 1 is therefore very useful in applications which have large angular motions, or applications where the STLD is mounted at an angle. Furthermore, the response of the STLD 1 is constant no matter what the direction of the motion of the STLD 1 is. This is in contrast to rectangular TLDs which have different responses depending on different motion directions. This is also true for angular motions.

Figure 3:
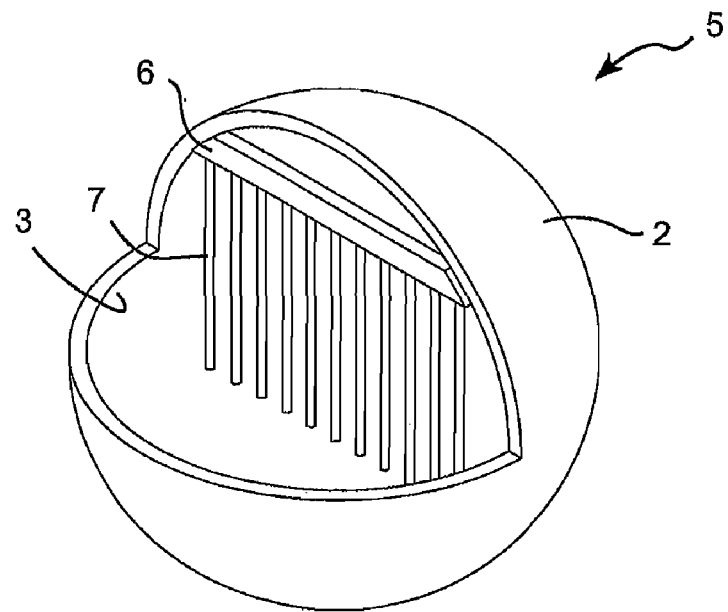
FIG. 3 shows a perspective partial section view of a second embodiment of a spherical tuned liquid damper according to the invention.
Figure 4:
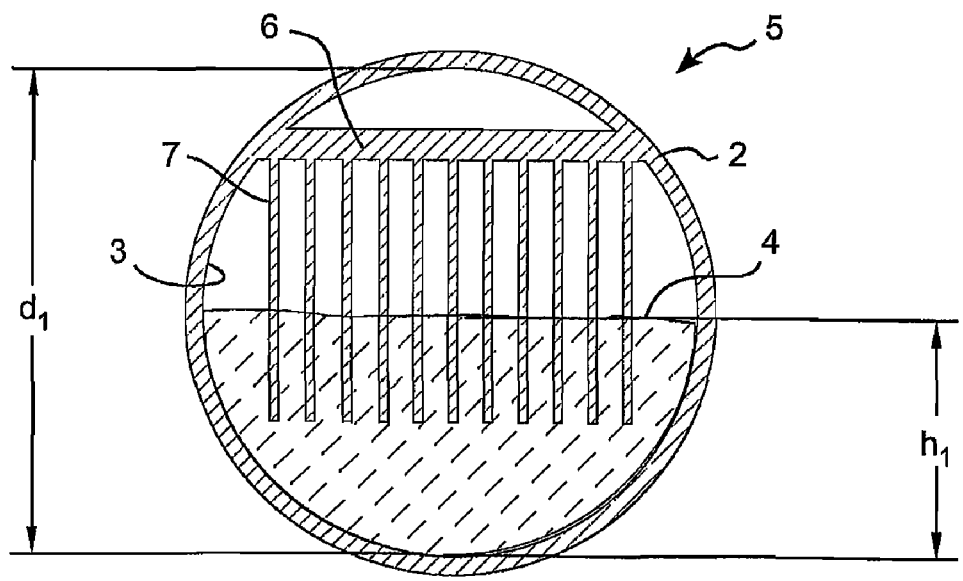
FIG. 4 shows a cross section view of the spherical tuned liquid damper of FIG. 3.

FIGS. 3 and 4 show a second embodiment 5 of a spherical tuned liquid damper (STLD) according to the invention. The STLD 5 comprises a spherical housing 2 and a hollow inner cavity 3 inside the housing 2. The inner surface of the hollow inner cavity 3 is spherical with a diameter of "$d_1$". Arranged inside the housing 2, is a cross bar 6 to which are connected a number of vertical bars 7. The hollow inner cavity 3 is partially filled with a fluid 4. The amount of fluid 4 in the hollow inner cavity 3 is defined by the height "$h_1$" of the fluid.

When the STLD 5 is displaced, the fluid will slosh back and forth within the inner cavity 3. Due to the vertical bars 7, the motion of the fluid 6 will be damped. The vertical bars 5 can therefore be considered as a form of fluid damping means. As previously mentioned, at around the dominant frequency of the STLD, the motion of the fluid in the STLD becomes circular. This should be taken into account when choosing the fluid damping means.

We note however that the damping of the STLD 5 shown in FIGS. 1 and 2 is dependent on the angular orientation of the STLD 5 since the vertical bars 7 are fixed at a certain orientation in the inner cavity 3. It could therefore be imagined that the cross bar 6, in another embodiment (not shown), is provided with adjustment means whereby the orientation of the cross bar can be adjusted such that the vertical bars can be arranged perpendicular to the direction of the main fluid motion. In another embodiment (not shown), the adjustment means could be self aligning.

When choosing an STLD for a particular application, the theory developed for rectangular and cylindrical TLDs can be used. That is to say, an STLD is chosen which has a natural frequency close to the frequency which is to be damped. For example, if the STLD is to be mounted on a cable and it is desired to dampen the first mode of vibration of the cable then the natural frequency of the STLD would be chosen to be close to the frequency of the first mode of vibration of the cable.

However, in some cases, the frequency to be dampened is not the dominant mode. It could for example be the frequency of the second mode, the third mode, etc. of the structure. It could also be a frequency which has nothing at all to do with the natural frequency, but is chosen with respect to other considerations. For example, in the case where the STLD is placed in a passenger vehicle, the STLD could be tuned such that the frequencies to be dampened are those which are uncomfortable for the passengers of the vehicle.

We also note that the STLD is a multi degree of freedom system and as such it has multiple natural frequencies. The STLD is usually tuned such that its fundamental or dominant natural frequency is matched to the frequency which is to be dampened. However, it could also be imagined that another one of the STLD's natural frequencies are matched to the structure. For example, the second or third natural frequency of the STLD could be matched to the frequency which is to be dampened. It could also be imagined that different natural frequencies of the STLD are tuned to match different frequencies which are to be dampened. For example, it could be imagined that the first natural frequency of the STLD is tuned to match the first natural frequency of the structure to be dampened and that the second natural frequency of the STLD is tuned to match the second natural frequency of the structure to be dampened. It should therefore be obvious that there are many different possibilities for tuning the STLD.

One of the advantages of the STLD is that due to the spherical shape of the STLD, the participation mass of the fluid is greater than with a corresponding rectangular or spherical TLD. Therefore, the mass required to achieve a certain amount of damping will be less with an STLD than with a rectangular or cylindrical TLD. As an example it is noted that for typical water heights, an STLD can have a participation mass of up to around 80% whereas a rectangular or cylindrical tank will have a participation mass of up to around 50%. The big difference between the STLD and the rectangular/cylindrical TLD is due to the dead zone in the bottom of rectangular/cylindrical tanks.

We also note that the damping of the STLD is dependent on many features. For example, the embodiment of FIGS. 3-4 had fluid damping means comprising a number of vertical bars. However, the fluid damping means could also be many other devices. As one example, consider the case where the damping means are a set of baffles which intersect the motion of the fluid. The baffles could be solid, they could be provided with holes, they could be made of mesh, they could be angled, etc. . . . As another example, the fluid damping means could be a number of particles floating on the surface of the fluid. The collisions between the floating particles when the fluid sloshes leads to further fluid damping. In most cases, the fluid damping means will be some sort of device which disturbs and therefore dampens the motion of the fluid. However, the viscosity of the fluid also affects the damping. A high viscosity fluid gives higher damping effect, whereas a low viscosity fluid gives a lower damping effect.

Furthermore, we note that the fluid could be chosen as a special type of fluid. For example, the fluid could be an electro-rheological fluid. In this way, the viscosity of the fluid can be actively controlled, thereby allowing active damping control of the STLD. Another example is where the fluid is a thixopropic fluid. A thixopropic fluid is a fluid which changes from a solid to a fluid when exposed to high shear forces. This type of fluid could for example be configured to be solid at low amplitudes of vibration and at low frequencies of vibration. However, when the amplitude of vibration or the frequency of vibration exceeded a certain threshold, the fluid would become fluid.

The STLD 1 could be used in many different applications. For example, an STLD could be mounted in a building, on a tower for example an aircraft control tower, on a mast for example a flag pole, on a monument, on cranes, on a piece of machinery, on a rocket, etc. . . . In another example, a STLD could be arranged in a wing tip of a wind turbine blade. In this case, the centrifugal force due to the rotation of the turbine blade will align the fluid in the STLD such that it is properly aligned with the longitudinal axis of the turbine blade. The STLD can then dampen torsional and/or lateral vibrations in the wing turbine blade.

As with rectangular and cylindrical TLDs, STLD could be manufactured in a number of standard sizes. In order to tune the standardly available STLDs, different amounts or types of fluid could be poured into the STLDs in order to tune their natural frequency to match the frequency which is to be dampened.

FIGS. 5-12 show four other embodiments of an STLD. The four embodiments of FIGS. 5-12, are similar in function to the first embodiment 1 and the second embodiment 5 of an STLD, so the four embodiments of FIGS. 5-12 will only be described briefly.

Figure 5:
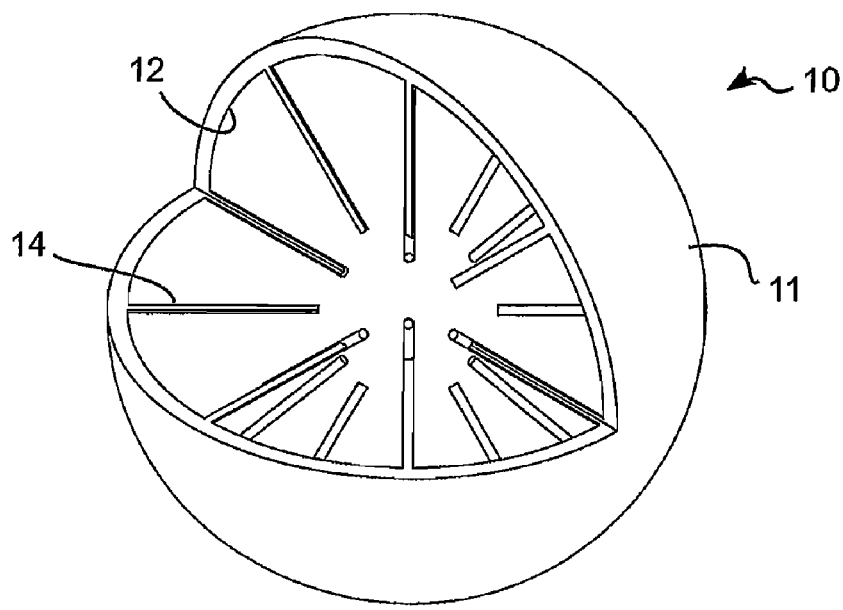
FIG. 5 shows a perspective partial section view of a third embodiment of a spherical tuned liquid damper according to the invention.
Figure 6:
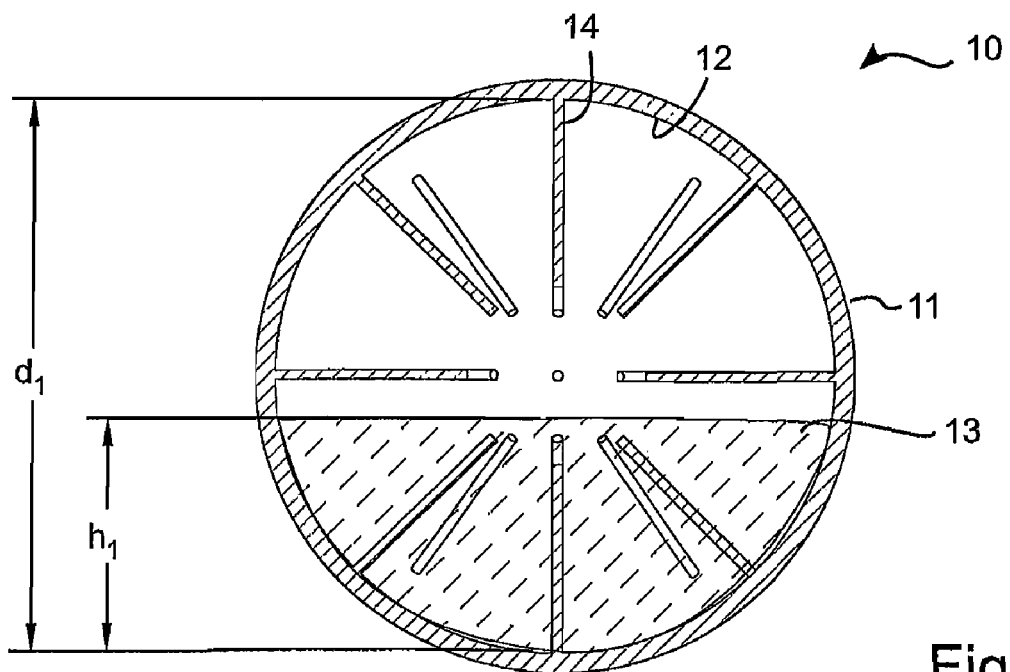
FIG. 6 shows a cross section view of the spherical tuned liquid damper of FIG. 5.

FIGS. 5 and 6 show a third embodiment 10 of an STLD. As with the first embodiment 1, the third embodiment 10 comprises a housing 11 in the form of a sphere and a hollow inner cavity 12 arranged inside the housing. The inner cavity 12 is in the form of a sphere with a diameter $d_1$. As before, the STLD is partially filed with a fluid 13 which has a height $h_1$. The third embodiment 10 furthermore comprises a number of bars 14 which protrude from the inner surface of the inner cavity 12 and extend towards the centre of the inner cavity 12. The bars 14 act as fluid damping means. In this case, since the bars are evenly distributed over the inner surface of the inner cavity 12 and are arranged perpendicular to the inner surface of the inner cavity 12, the damping effect of the fluid damping means and therefore also the damping effect of the STLD is essentially constant for any orientation of the STLD.

Figure 7:
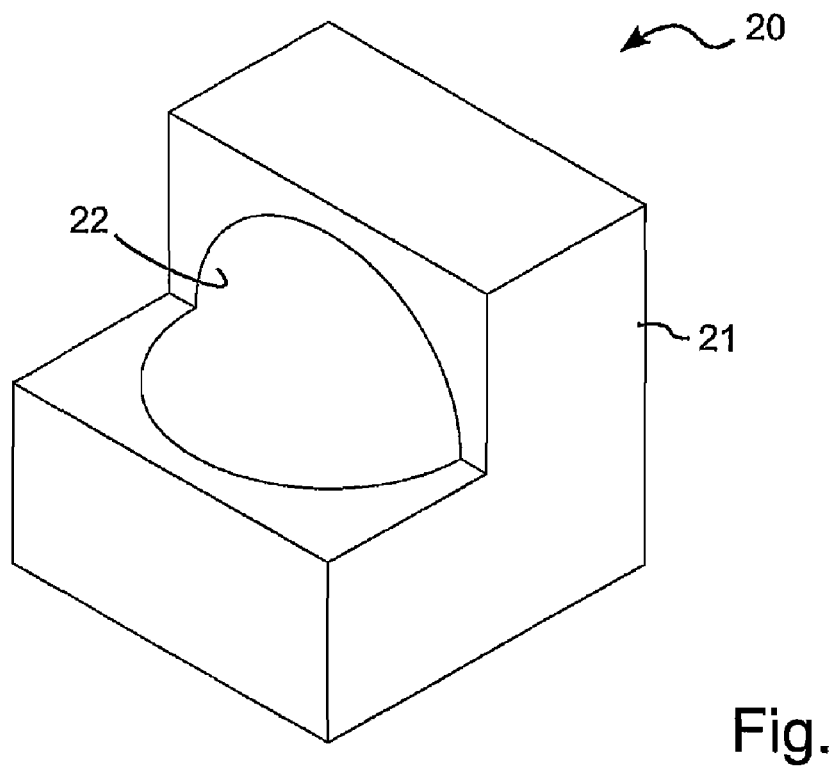
FIG. 7 shows a perspective partial section view of a fourth embodiment of a spherical tuned liquid damper according to the invention.
Figure 8:
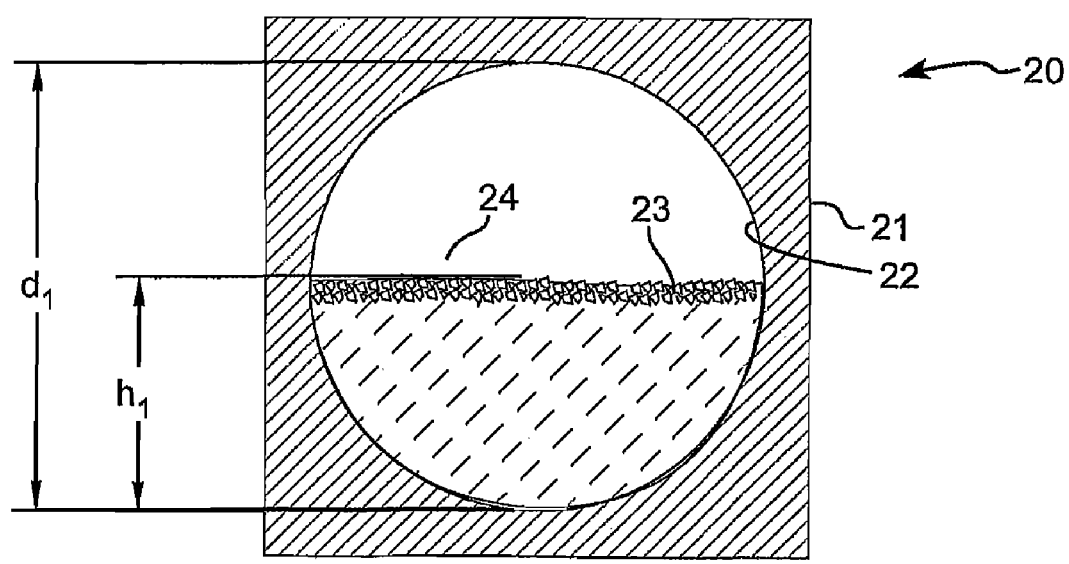
FIG. 8 shows a cross section view of the spherical tuned liquid damper of FIG. 7.

FIGS. 7 and 8 show a fourth embodiment 20 of an STLD. In this embodiment, the housing 21 is formed as a cube. In this way, the STLD 20 is easy to mount in a structure. The inner cavity 22 of the STLD 20 is however still spherical. As before the inner cavity 22 is partially filled with a fluid 23 having a height $h_1$. Floating on the surface of the fluid 23 are a large number of small particles 24. During the motion of the fluid 23, the small particles 24 will collide with each other and with the walls of the inner cavity 22 and absorb energy thereby dampening the motion of the fluid 23. It should be noted that as previously mentioned, when the motion of the STLD approaches the natural frequency, the motion of the fluid begins to be circular. In this case, the damping due to the particles is reduced since the collisions between the particles are reduced due to the circular motion instead of the back and forth wavy motion which is typical at frequencies below the natural frequency.

Figure 9:
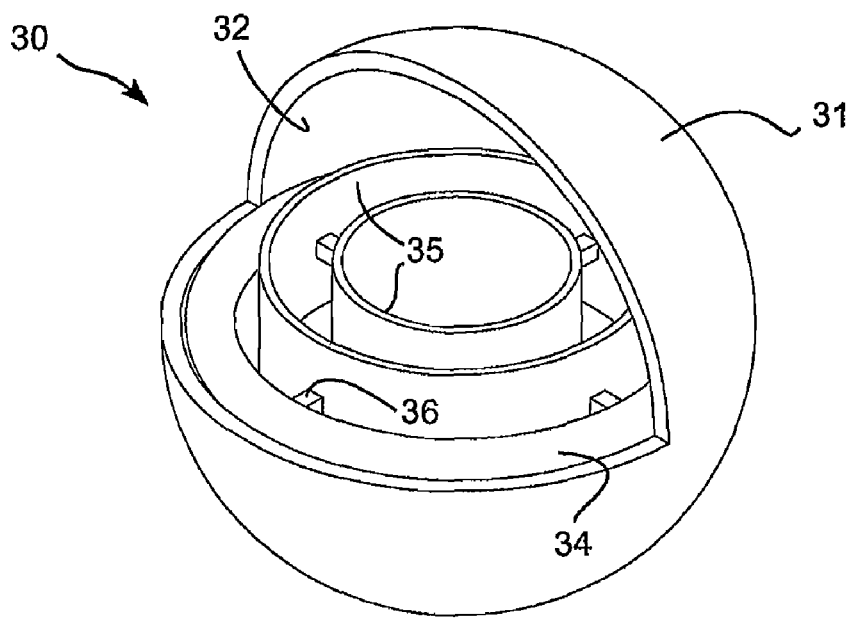
FIG. 9 shows a perspective partial section view of a fifth embodiment of a spherical tuned liquid damper according to the invention.
Figure 10:
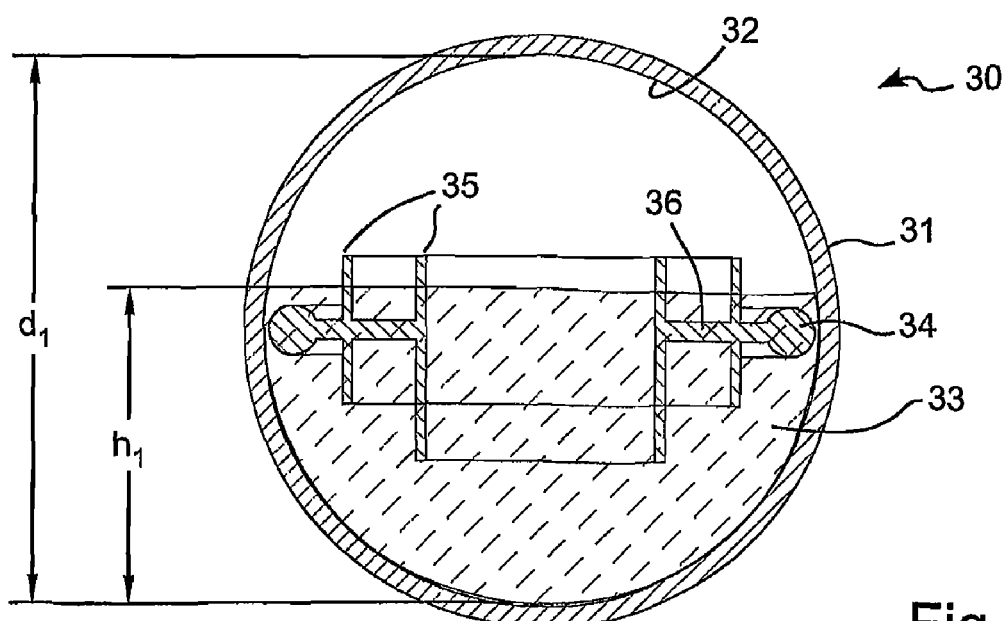
FIG. 10 shows a cross section view of the spherical tuned liquid damper of FIG. 9.

FIGS. 9 and 10 shows a fifth embodiment 30 of an STLD. As before, the STLD comprises a spherical housing 31 with a spherical inner cavity 32 filled with a fluid 33 at a height $h_1$. Floating in the fluid 33 is a floating ring 34 which supports two circular baffles 35. The baffles are connected to the floating ring 34 by cross pieces 36. Due to the floating ring 34, the baffles will arrange themselves in a proper orientation with respect to the surface of the fluid 33, no matter in which orientation the STLD is placed. In other words, the fluid damping means, in this case the baffles, will align themselves into their proper orientation when the orientation of the STLD 30 is changed. Therefore the damping of the STLD is constant and independent of the orientation of the STLD 30. Please note that the baffles in this embodiment are made from a porous mesh material which allows the fluid to flow through the baffles. The function of the baffles is to slow down the fluid, not completely block it from moving.

It should be mentioned, that due to the spherical shape of the inner cavity 32, the floating ring 34 will always be arranged around the centre of the inner cavity 34, independent of the amount of fluid in the STLD. Therefore, for very large fluid heights or very small fluid heights, different floating ring arrangements would need to be used. It should also be mentioned that the floating ring is arranged in such a way that it reacts very slowly to changes in orientation of the STLD. In this way, the motion of the floating ring arrangement does not contribute to the dynamics of the STLD.

Figure 11:
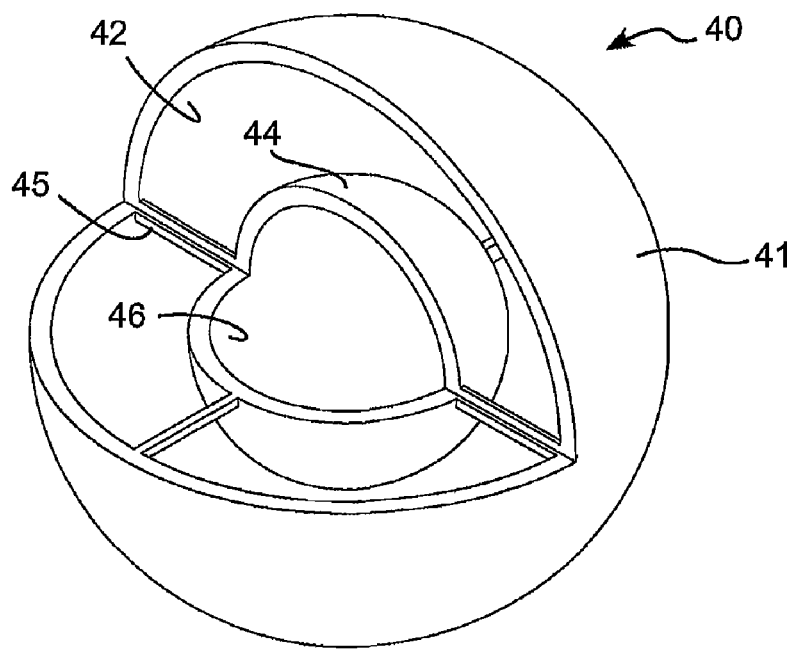
FIG. 11 shows a perspective partial section view of a sixth embodiment of a spherical tuned liquid damper according to the invention.
Figure 12:
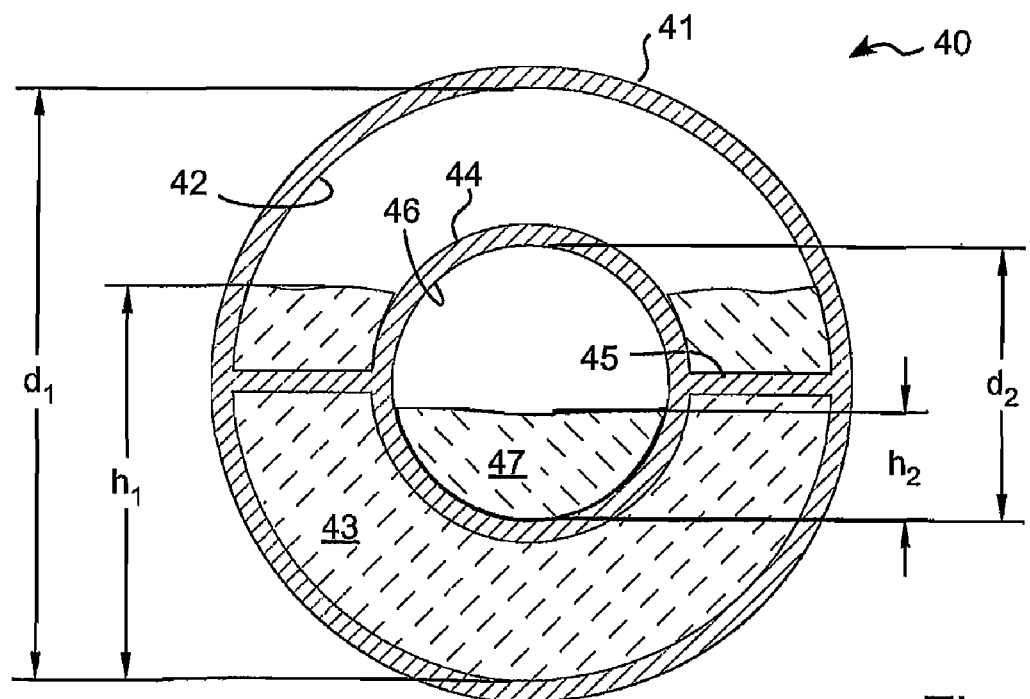
FIG. 12 shows a cross section view of the spherical tuned liquid damper of FIG. 11.

FIGS. 11 and 12 show a sixth embodiment 40 of an STLD. In this case, as before, the STLD 40 comprises a housing 41 with a spherical inner cavity 42 having a diameter $d_1$ and being filled with a first fluid 43 having a height $h_1$. In contrast to the previous embodiments however, a spherical inner element 44 is arranged within the housing 41 and concentric to the housing 41. The spherical inner element 44 is rigidly connected to the housing 41 via cross pieces 45. In this way, the motion of the inner element 44 is identical with the motion of the housing 41. It is to be noted that the participating mass of the first fluid 43 can be up to 100% due to the double wall arrangement. Therefore, the performance to mass ratio of a sphere within a sphere arrangement is even higher than for a standard STLD as described in the previous embodiments.

Furthermore, in the current embodiment 40, the inner element 44 has a spherical inner cavity 46 of diameter $d_2$ partially filed with a second fluid 47 having a height $h_2$. The natural frequency of the first fluid 43 and the second fluid 47 can be chosen different from each other. In one example, the natural frequency of the first fluid 43 could be chosen to match the frequency of the first mode of the structure to be dampened and the natural frequency of the second fluid 47 could be chosen to match the frequency of the second mode of the structure to be dampened. In this way, the frequencies of both the first and second modes of the structure can be dampened.

It is to be noted, that in order to achieve the higher mass participation of the sphere in sphere embodiment, it is not necessary for the inner element to have an inner cavity filed with a second fluid. The inner element could be solid or filled with air. In this case, the STLD will have only a single natural frequency, but the higher mass participation effect will still be noticeable. It is also to be noted that the sixth embodiment 40 showed no fluid damping means. However, it should be obvious that some sort of fluid damping means will have a positive effect on the damping effect of the sixth embodiment 40 of the STLD. Fluid damping means are however, not shown in order to pre-vent unnecessarily complicating the figure. Furthermore, it should be noted that the inner cavity 42 of the housing 41 could have a first fluid damping means and the inner cavity 46 of the inner element 44 could have a second fluid damping means. Furthermore we note that the first and second fluids could be the same or different depending on the desired characteristics of the STLD 40.

Figure 13:
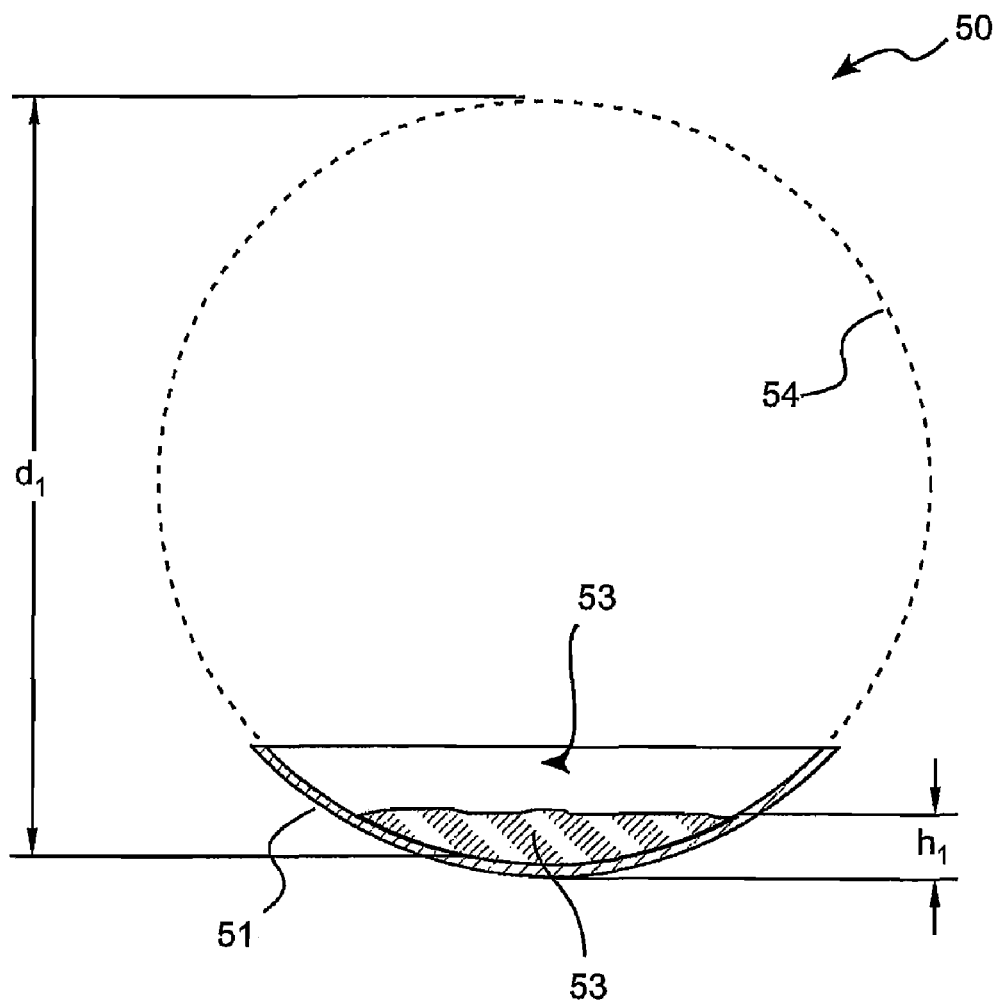
FIG. 13 shows a cross section view of a seventh embodiment of a spherical tuned liquid damper according to the invention.

FIG. 13 show a seventh embodiment 50 of an STLD. In this case, as before, the STLD 50 comprises a housing 51 with a spherical inner cavity 52 having a diameter $d_1$ and being filled with a first fluid 53 having a height $h_1$. In contrast to the previous embodiments however, the housing does not comprise a full sphere, but only comprises a partial sphere. The dotted line 54 shows the outline of the "rest of the sphere" if the housing were a complete sphere. The housing 51 of the current embodiment 50, could be understood as a "shallow dish", where the inner surface is essentially spherical. This type of embodiment is interesting for the case where the desired natural frequency of the STLD requires a large inner diameter and a shallow water depth. This is in cases of low frequency. One example of the use of such an STLD is in wind turbine towers.

The partial sphere STLD, will of course, have a smaller tolerance for angular changes than a full spherical STLD. However, the increased active mass of the liquid in the partial STLD, is maintained. The partial sphere STLD, can therefore achieve a higher performance to mass ratio than a corresponding shallow cylindrical TLD. In addition, the partial sphere STLD, will of course also be superior to a rectangular TLD in many cases.

Figure 14:
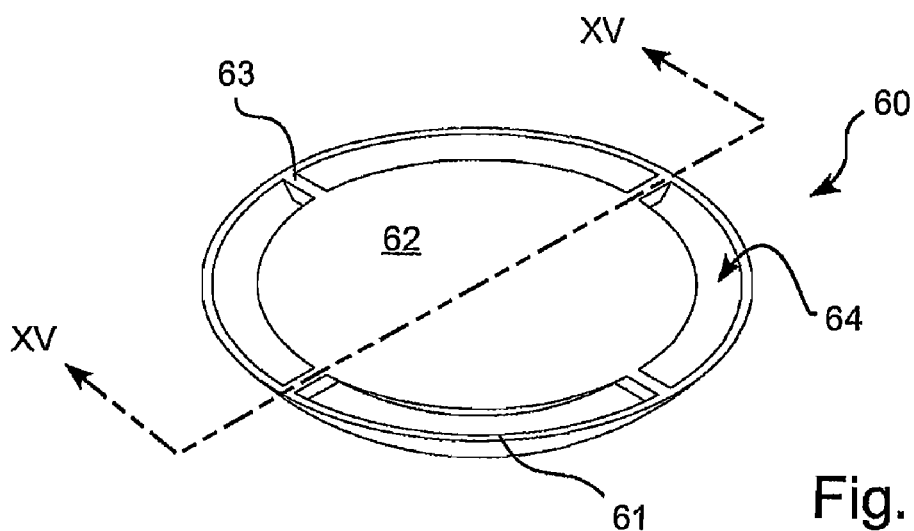
FIG. 14-16 shows three views of an eighth embodiment of a spherical tuned liquid damper according to the invention.
Figure 15:
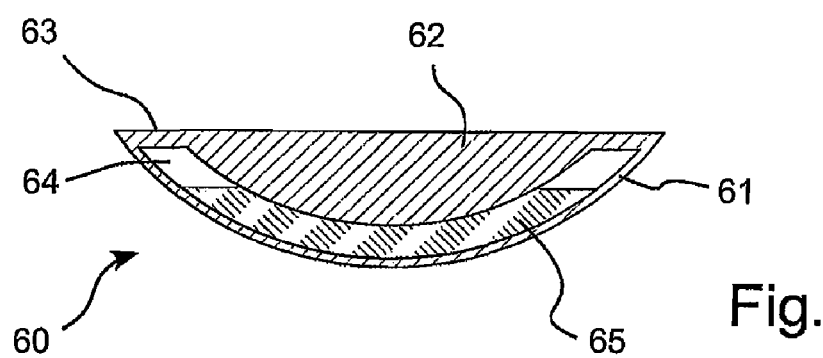
Figure 16:
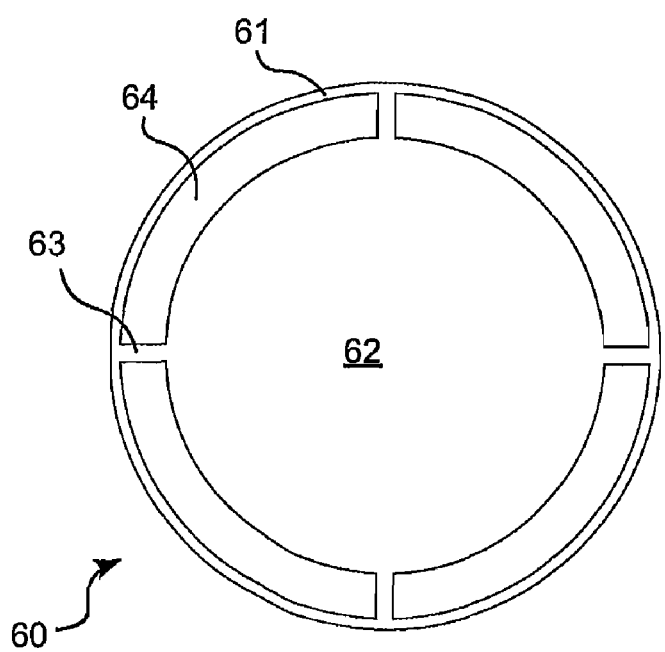

The embodiment 60 shown in FIGS. 14-16, is an example of a housing 61 in the form of a partial sphere where another smaller partial sphere 62 is arranged inside the first partial sphere. The inner partial sphere 62 is held in place by support elements 63 arranged between the inner partial sphere 62 and the outer partial sphere 61. This arrangement results in a gap 64 between the two partial spheres 61,62. The effect of this is to further increase the mass participation of the fluid 65 arranged in the gap. This embodiment is suitable for applications where a low frequency is desired.

Figure 17:
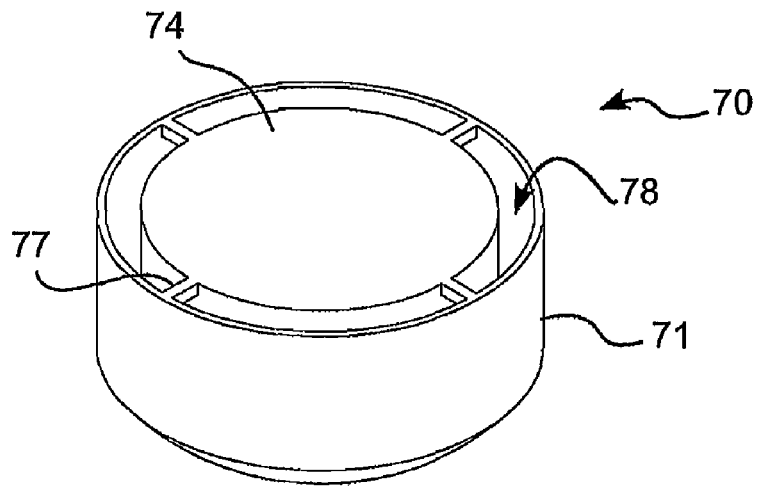
FIGS. 17-19 shows three views of a ninth embodiment of a spherical tuned liquid damper according to the invention.
Figure 18:
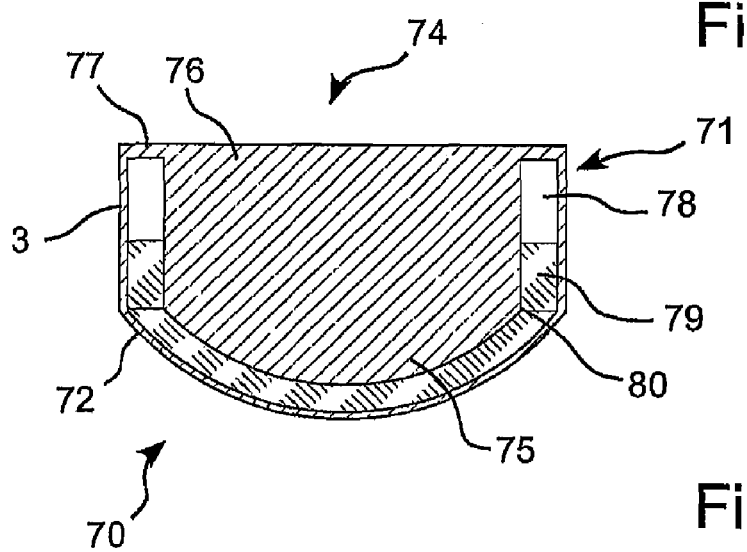
Figure 19:
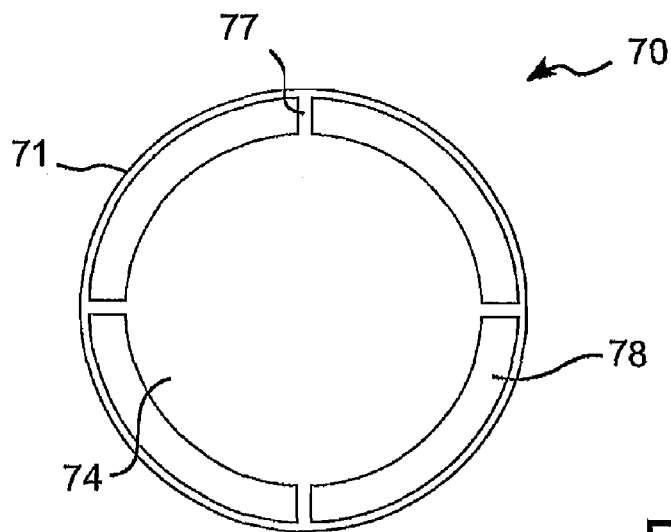

The embodiment 70 shown in FIGS. 17-19, is an example of another solution having a high mass participation. In this case, the damper 70 comprises an outer housing 71 with two parts, a lower partial spherical part 72 and an upper cylindrical part 73. An inner core 74 having a lower spherical part 75 and an upper cylindrical part 76 is arranged inside the outer housing 71. Support elements 77 keep the outer housing 71 and the inner core 74 fixed in relation to each other. Due to the arrangement of the inner core and the outer housing, a gap 78 is formed between the inner surface of the outer housing 71 and the outer surface of the inner core 74. Fluid 79 is arranged in this gap. Due to this arrangement, the fluid is forced to slosh back and forth in this gap. The advantage of this solution is a higher mass participation and a response which is the same for motion in any direction on a plane. One example of a good application of this solution is in the tower of a wind turbine.

It should also be noted that a cylinder in cylinder solution such as the one disclosed in FIGS. 17-19 could also be imagined where the lower part of the housing was not spherical, but had another shape. For example a rectangular cylinder could be arranged inside another rectangular cylinder, or a round cylinder could be arranged in another round cylinder. The lower part of the two cylinders could be formed in many different ways, depending on the desired damping properties.

We note that the above description has disclosed nine embodiments of an STLD. These embodiments should be understood as examples only. Many other STLDs could be imagined which are included within the scope of the current invention. For example, we note that all the embodiments shown above have had inner cavities which were perfect spheres. However, it should be obvious to the person skilled in the art that the inner cavity need not be perfectly spherical in order for the invention to work. For example, the inner surface could be essential spherical. By essentially spherical is meant, a shape which is not perfectly spherical but nearly so. For example an ellipsoidal shape would be considered to be essentially spherical. Another example would be a case where the inner surface of the cavity is undulating, but the average form of the cavity is spherical. Furthermore, we note that the inner surface could be formed with protrusions in order to dampen the motion of the fluid in the cavity. These protrusions should not be considered when interpreting the overall shape of the inside surface of the inner cavity. Also, partial spheres, for example a half a sphere or a quarter of a sphere are also considered to comprise a surface which is essentially spherical, even though they do not comprise an entire sphere.

We also note that the invention as claimed, comprises damping means as a part of the invention. However the teaching of the application comprises other embodiments which are not included in the scope of the claims, but which could form their own independent applications if it is desired by the applicant. For example, the person skilled in the art should be able to see that the sphere in sphere solution, the cylinder in cylinder solution and the partial sphere solution could be formed with or without internal damping means.

The invention claimed is:

1. A tuned liquid damper that relies on the motion of a fluid in a cavity for changing the dynamic characteristics of the structure to which it is attached, said tuned liquid damper comprising:
    a housing with a hollow cavity within said housing and a first fluid which partially fills said hollow cavity, and where the inner surface of said hollow cavity is essentially spherical,
    wherein said tuned liquid damper further comprises first fluid damping means arranged within the essentially spherical cavity of the housing,
    wherein said first fluid damping means is self-aligning such that the damping action is constant regardless of the orientation of the tuned liquid damper, and
    wherein the tuned liquid damper is suitable for damping translational vibrations.

2. A tuned liquid damper according to claim 1, wherein that the first fluid damping means comprises a number of elements floating in the first fluid.

3. A tuned liquid damper according to claim 1 wherein the first fluid damping means are disturbance elements arranged within the essentially spherical cavity of the housing and arranged to disturb the motion of the first fluid.

4. A tuned liquid damper according to claim 1 wherein said tuned liquid damper further comprises an inner element with an essentially spherical outer surface, said inner element being arranged essentially co-centric within the essentially spherical hollow cavity of the housing and being essentially rigidly connected to the housing.

5. A tuned liquid damper according to claim 4, wherein the inner element comprises an essentially spherical hollow cavity which is at least partially filled with a second fluid.

6. A tuned liquid damper according to claim 5, wherein second liquid damping means are arranged within the essentially spherical hollow cavity of the inner element.

7. A tuned liquid damper according to claim 5 wherein the second fluid in the essentially spherical hollow cavity of the inner element is different than the first fluid which is arranged in the essentially spherical hollow cavity of the housing.

8. A tuned liquid damper according to claim 1 wherein the amount of fluid in the essentially spherical hollow cavity of the housing is selected such that a natural frequency of said tuned liquid damper essentially matches the desired frequency to be dampened.

9. A tuned liquid damper according to claim 6 wherein the amount of fluid in the essentially spherical hollow cavity of the housing is selected such that a natural frequency of the fluid motion in the cavity of the housing essentially matches the first frequency to be dampened and that the amount of fluid in the essentially spherical hollow cavity of the inner element is selected such that a natural frequency of the fluid motion in the cavity of the inner element essentially matches the second frequency to be dampened.

10. A tuned liquid damper according to claim 1 wherein the fluid is an electro or a magneto rheological fluid.

11. A tuned liquid damper according to claim 1 wherein the fluid is a thixotropic fluid.

12. A tuned liquid damper according to claim 1 wherein the housing comprises a partial sphere.

13. A structure comprising at least one tuned liquid damper according to claim 1.

14. A structure according to claim 13, wherein said structure is a cable, a building, a mast, a wind-turbine tower or wing, or a telecommunications tower.

15. A structure according to claim 13, wherein said structure comprises at least two tuned liquid dampers according to claim 1 and that a first of said at least two tuned liquid dampers is tuned to a first frequency to be dampened and that a second of said at least two tuned liquid dampers is tuned to a second frequency to be dampened.

16. A tuned liquid damper according to claim 7 wherein the amount of fluid in the essentially spherical hollow cavity of the housing is selected such that a natural frequency of the fluid motion in the cavity of the housing essentially matches the first frequency to be damped and the amount of fluid in the essentially spherical hollow cavity of the inner element is selected such that a natural frequency of the fluid motion in the cavity of the inner element essentially matches the second frequency to be dampened.

* * * * *